United States Patent Office 2,771,390
Patented Nov. 20, 1956

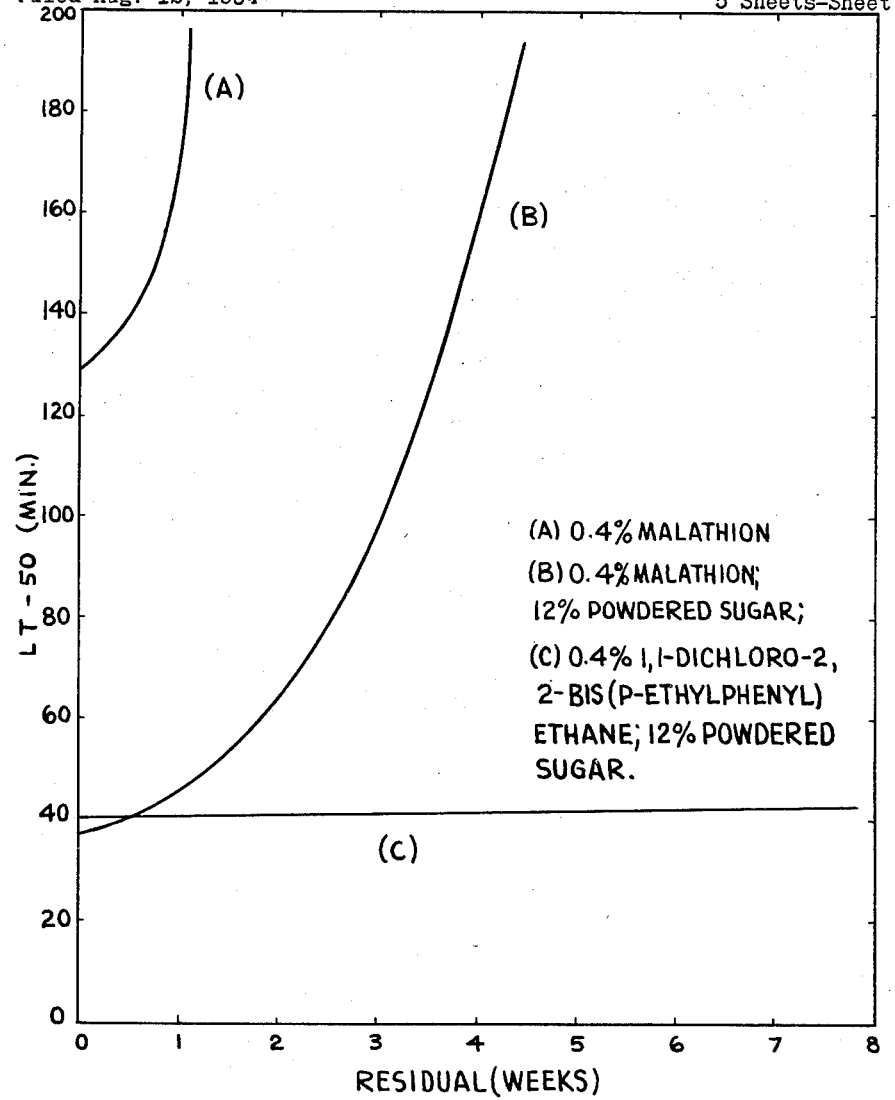
Fig 1. COMPARATIVE EFFICIENCY AND PERSISTENCE OF 1,1-DICHLORO-2, 2-BIS(P-ETHYPHENYL)ETHANE AS A STOMACH POISON FOR HOUSE FLIES, MUSCA DOMESTICA.

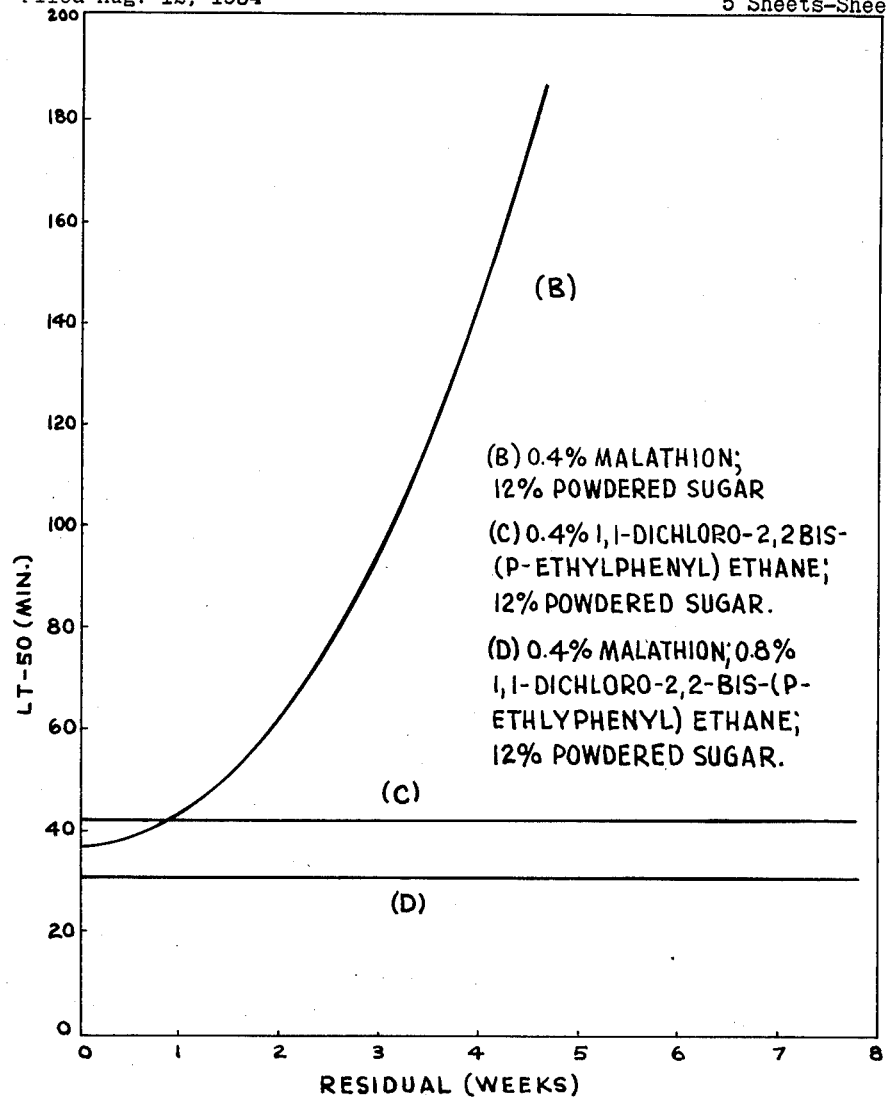
Fig.2. COMPARATIVE EFFICIENCY AND PERSISTENCE OF COMPOSITIONS CONTAINING 1,1-DICHLORO-2,2-BIS(P-ETHYLPHENYL) ETHANE AND MALATHION IN A 2:1 RATIO RESPECTIVELY AS A STOMOACH POISON FOR HOUSEFLIES, MUSCA DOMESTICA.
SIGNATURE OF INVENTORS

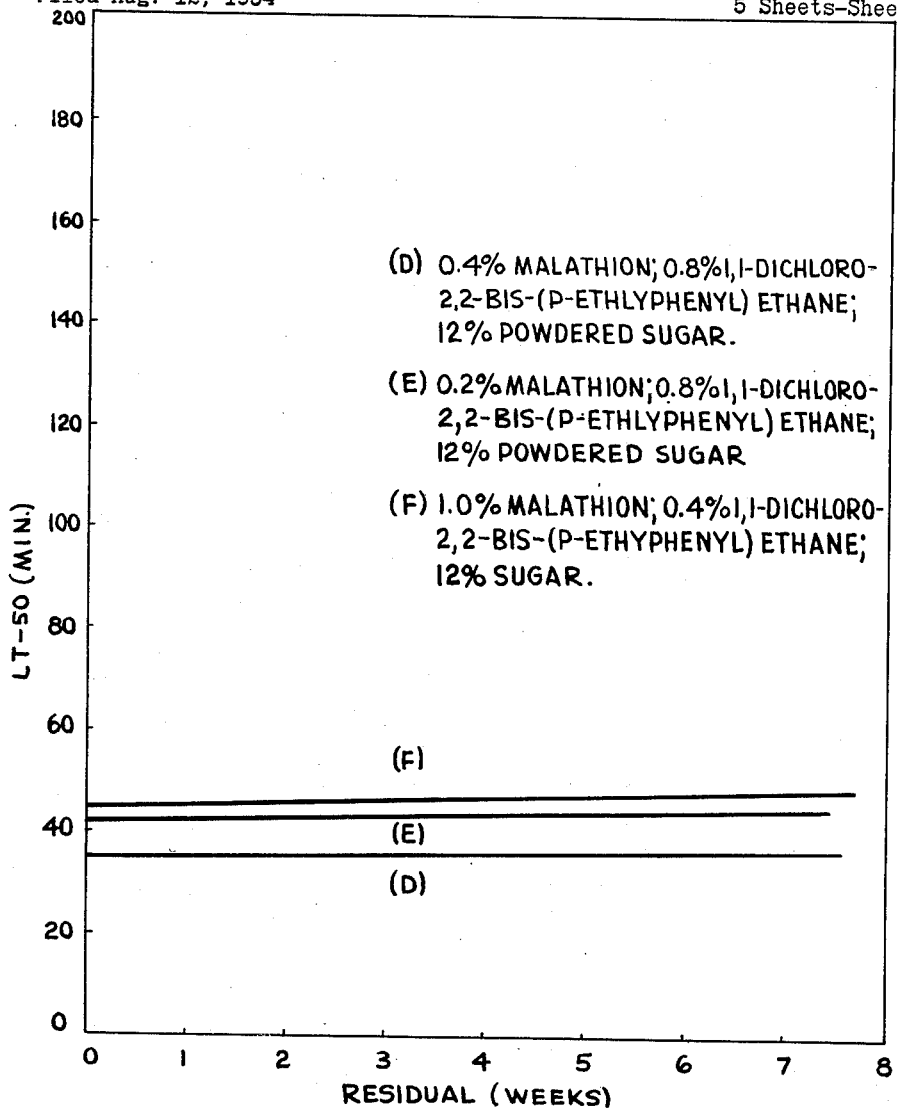
Fig. 3. COMPARATIVE EFFICIENCY AND PERSISTENCE OF COMPOSITIONS CONTAINING 1,1-DICHLORO-2,2-BIS(P-ETHYLPHENYL) ETHANE AND MALATHION MIXED IN VARIOUS PROPORTIONS AS STOMACH POISON FOR HOUSE FLIES, MUSCA DOMESTICA Nov. 20, 1956 B. WILLIAMSON ET AL 2,771,390
SYNERGISTIC INSECTICIDAL COMPOSITIONS
Filed Aug. 12, 1954 5 Sheets-Sheet 4
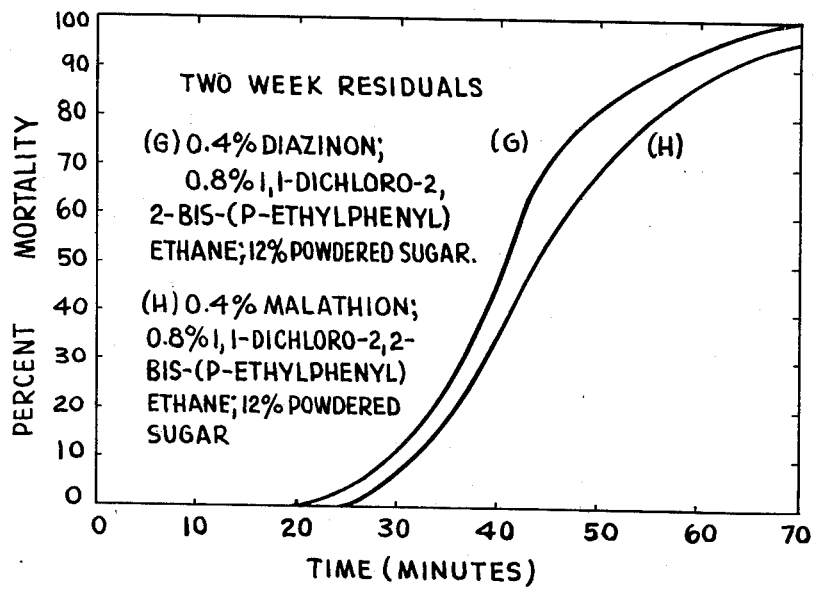
Fig. 4; COMPARATIVE EFFICIENCY AND PERSISTENCE OF COMPOSITIONS CONTAINING 1,1-DICHLORO-2,2-BIS(P-ETHYLPHENYL) ETHANE; AND SUBSTANCES OTHER THAN MALATHION AS STOMACH POISONS FOR HOUSEFLIES, MUSCA DOMESTICA.
SIGNATURE OF INVENTORS

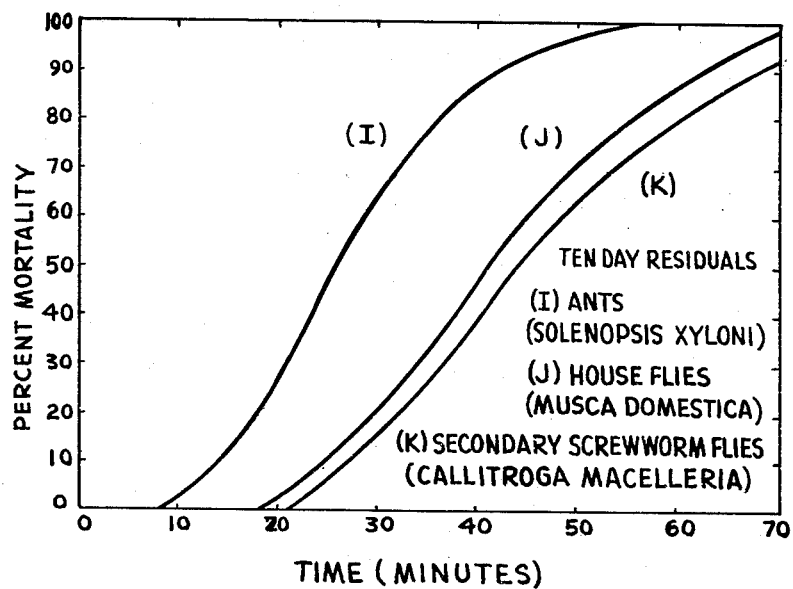
Fig.5. COMPARATIVE EFFICIENCY AND PERSISTENCE OF COMPOSITIONS CONTAINING 1,1-DICHLORO-2,2-BIS(P-ETHYLPHENYL)ETHANE AND MALATHION IN KILLING INSECTS OTHER THAN MUSCA DOMESTICA.

2,771,390
SYNERGISTIC INSECTICIDAL COMPOSITIONS

Byron Williamson and Thurmond A. Williamson, Dallas, Tex.

Application August 12, 1954, Serial No. 449,342

6 Claims. (Cl. 167—30)

This invention relates to new and useful improvements in insecticides.

This invention relates particularly to the use of 1,1-dichloro-2,2-bis(p-ethylphenyl)ethane as a stomach poison for killing houseflies and other insects, and to the use of combinations of 1,1-dichloro-2,2-bis(p-ethylphenyl)ethane with other insecticides as useful stomach poisons for killing houseflies and other insects.

In the past many types of insects have been controlled by the application of chemicals which would act as contact poisons. Because of biological resistance attained by certain insects, especially houseflies, to this method of control, the method has become increasingly less reliable for the prevention of economic loss and the prevention of the spread of disease. Many other methods of insect control by chemicals have been reported, but none have ever attained the widespread economic importance and acceptance of the contact poisons.

One other such method of insect control has been the application of chemicals in a form that the insect in question will ingest, in which case the primary killing action is that of a stomach poison. This method has previously not received extensive usage due to a variety of drawbacks such as high mammalian toxicity, lack of duration of insect control obtainable, lack of satisfactory insect baits, and lack of convenient and economical methods of application.

Figs. 1 through 3 of the drawings are graphs demonstrating the effectiveness of various insecticidal preparations, and Figs. 4 and 5 are graphs illustrating the residual effectiveness of various insecticidal preparations.

Our invention has overcome the drawbacks enumerated hereinabove and is as follows:

The well-known contact insecticides, DDT, chlordane, benzene hexachloride, and others, have been tested by us and found to be relatively poor stomach poisons against houseflies and certain other insects. However, a chemical relative to DDT, 1,1-dichloro-2,2-bis(p-ethylphenyl)-ethane, has been discovered by us to be an exceedingly effective stomach poison for houseflies and other insects when used with a suitable bait. We have also discovered that the chemical 1,1-dichloro-2,2-bis(p-ethylphenyl)-ethane, when used with a residual type bait such as powdered sugar, will retain its killing power for many weeks.

However, it has been demonstrated that houseflies and certain other insects will develop a tolerance to certain known chlorinated hydrocarbon insecticides used either as contact poisons or stomach poisons.

It has been previously reported that the chemical O,O-dimethyl dithiophosphate of diethyl mercaptosuccinate, more commonly known as malathion, is effective as a stomach poison for houseflies resistant to chlorinated hydrocarbon insecticides when applied with a bait such as granulated sugar or molasses. The chemical malathion is of sufficiently low mammalian toxicity to make it a candidate for this use. Malathion is inefficient, however, when used alone, because of its relatively high vapor pressure which causes its period of effectiveness to be relatively short.

We have discovered that the combination of 1,1-dichloro-2,2-bis(p-ethylphenyl)ethane and malathion in certain proportions produces a substance which (1) is highly effective as a stomach poison for houseflies and certain other insects, (2) has sufficiently low mammalian toxicity to justify extensive field and commercial use, (3) has rapid initial killing effects, (4) has prolonged residual activity when properly used with residual type baits, (5) will be effective against species of insects which have developed a tolerance to chlorinated hydrocarbon insecticides.

This discovery is adaptable to methods of application which are both convenient enough to encourage widespread use, and which are also economical.

General methods and procedures.—Emulsifiable concentrates and wettable powders were prepared from the technical insecticides. Water emulsion baits were prepared by mixing various proportions of these emulsifiable concentrates or wettable powders with sugar or other baits, and water. To determine insecticidal activities of the above preparations, the preparations were applied to test surfaces to the point of runoff, allowed to dry and age, and insects exposed, and the resulting mortalities determined.

Dry baits were also prepared by mixing or grinding various proportions of the emulsifiable concentrates or wettable powders with suitable dry baits such as sugar alone, or in combination with various inert carriers.

For example, an emulsifiable concentrate of 1,1-dichloro-2,2-bis(p-ethylphenyl)ethane was prepared by mixing 25 parts of 1,1-dichloro-2,2-bis(p-ethylphenyl)-was prepared by mixing 25 parts of 1,1-dichloroethane, 65 parts xylene and 10 parts of polyoxyethylene sorbitol oleate-laurate (as emulsifier). A water emulsion bait was prepared by mixing 1.6 parts of the emulsifiable concentrate, 11.4 parts of powdered sugar, and 87 parts of water. This bait was applied to uniformly unpainted plywood surfaces to the point of runoff and allowed to dry. Insects were exposed to these treated surfaces and the resulting mortalities recorded.

Example 1.—The efficiency and persistence of 1,1-dichloro-2,2-bis,p-ethylphenyl)ethane as a stomach poison for houseflies, Musca domestica. See Figure I.

Figure I plots the LT–50 values in minutes as a function of the age of the treated surface in weeks. The LT–50 values are the length of time in minutes required to kill 50% of the insects exposed. Figure I compares the effectiveness of malathion without sugar (A), malathion with powdered sugar (B), and 1,1-dichloro-2,2-bis(p-ethylphenyl)ethane with sugar (C). These results show that malathion without a bait is neither effective nor persistent; that malathion as a bait is more effective but not persistent; and that 1,1-dichloro-2,2-bis(p-ethylphenyl) ethane as a bait is both effective and persistent.

Example 2.—The efficiency and persistence of compositions containing 1,1-dichloro-2,2-bis(p-ethylphenyl)-ethane and malathion in a 2:1 ratio respectively as a stomach poison for houseflies, Musca domestica. See Figure II. Figure II shows that this combination (D) is more effective and equally persistent to either of curves (B) and (C) of Example I.

Example 3.—The efficiency and persistence of compositions containing 1,1-dichloro-2,2-bis(p-ethylphenyl)-ethane and malathion mixed in several proportions as stomach poisons for houseflies, Musca domestica. See Figure III. Figure III shows that 1,1-dichloro-2,2-bis(p-ethylphenyl)ethane and malathion when mixed in several proportions are both effective and persistent,

*Example 4.*—The efficiency and persistence of compositions containing 1,1-dichloro-2,2-bis(p-ethylphenyl) ethane and substance other than malathion as stomach poisons for houseflies, *Musca domestica*. See Figure IV. Figure IV plots percent insect mortality as a function of the time of exposure in minutes. Figure IV shows that 1,1-dichloro-2,2-bis(p-ethylphenyl)ethane may be combined with substances other than malathion to produce results which are both effective and persistent. Curve G illustrates the residual effectiveness of an insecticidal mixture containing 0.4% O,O - diethyl-O-[2-isopropyl-4-methyl pyrimidinyl (6)] thiophosphate, better known as diazinon, 0.8% 1,1-dichloro-2,2-bis(p-ethylphenyl)ethane, and powdered sugar. Curve H is a similar plotting of the results obtained from a mixture wherein the diazinon is replaced with malathion.

*Example 5.*—The efficiency and persistence of compositions containing 1,1 - dichloro-2,2-bis(p-ethylphenyl) ethane and malathion in killing insects other than *Musca domestica*. See Figure V.

We claim:

1. A useful substance including two parts 1,1-dichloro-2,2-bis(p-ethylphenyl)ethane and one part O,O-dimethyl dithiophosphate of diethyl mercaptosuccinate as a stomach poison for insects.

2. A useful substance including 1,1-dichloro-2,2-bis(p-ethylphenyl)ethane and O,O-dimethyl dithiophosphate of diethylmercaptosuccinate as a stomach poison for insects.

3. A useful substance including 1,1-dichloro-2,2-bis(p-ethylphenyl)ethane and another substance selected from the group consisting of O,O-dimethyl dithiophosphate of diethyl mercaptosuccinate and O,O-diethyl-O-[2-isopropyl-4-methyl pyrimidinyl(6)]thiophosphate as a stomach poison for insects.

4. A stomach poison for insects including 1,1-dichloro-2,2-bis(p-ethylphenyl)ethane, a residual type bait, and another substance selected from the group consisting of O,O-dimethyl dithiophosphate of diethyl mercaptosuccinate and O,O-diethyl-O-[2-isopropyl-4-methyl pyrimidyl (6)] thiophosphate.

5. A stomach poison for insects as set forth in claim 4 wherein the substance selected from the specified group is present in the quantity of one-half of the quantity of the first named ingredient.

6. A stomach poison for insects including two parts 1,1-dichloro-2,2-bis(p-ethylphenyl)ethane, one part of another substance selected from the group consisting of O,O-dimethyl dithiophosphate of diethyl mercaptosuccinate and O,O - diethyl-O-[2-isopropyl-4-methyl pyrimidyl (6)] thiophosphate, and in excess of ten parts of sugar.

References Cited in the file of this patent

Chemical Week, vol. 72, June 13, 1952, p. 9.
Gahan: Agricultural and Food Chemistry, vol. 2, Apr. 14, 1954, pp. 425 to 428.